L. L. ROGERS.
VEHICLE WHEEL.
APPLICATION FILED OCT. 26, 1909.

981,947.

Patented Jan. 17, 1911.

Witnesses:
Sydney T. Taft.
Franklin E. Low.

Inventor:
Leo L. Rogers
By his attorney,
Charles S. Gooding.

UNITED STATES PATENT OFFICE.

LEO L. ROGERS, OF BOSTON, MASSACHUSETTS, ASSIGNOR TO ROGERS UNIKA WHEEL COMPANY, A CORPORATION OF MAINE.

VEHICLE-WHEEL.

981,947.   Specification of Letters Patent.   Patented Jan. 17, 1911.

Application filed October 26, 1909.   Serial No. 524,699.

*To all whom it may concern:*

Be it known that I, LEO L. ROGERS, a citizen of the United States, residing at Boston, in the county of Suffolk and State of Massachusetts, have invented new and useful Improvements in Vehicle-Wheels, of which the following is a specification.

This invention relates to wheels for vehicles and is especially adapted for use in power vehicles such as automobiles and the like.

The object of the invention is to provide a wheel which, by reason of its having a solid rubber tire, cannot be injured by puncturing or cutting the same, as is the case in pneumatic tires, the wheel being constructed so as to be capable of being driven positively and consisting, broadly, of two parts, a rim and a hub, which are so connected together that the rim may yield relatively to the hub in a radial direction, but is locked against rotation relatively to said hub.

The invention consists in a wheel consisting of a hub and a rim with yielding means interposed between the hub and the rim to allow said hub and rim to move radially relatively to each other, said rim and hub being coupled together by other means in such a manner that they cannot be rotated relatively to each other, although they are movable relatively to each other in a radial direction.

The invention consists further in certain details of construction and combination of parts as fully set forth in the following specification and particularly as pointed out in the claims.

Figures 1, 2:
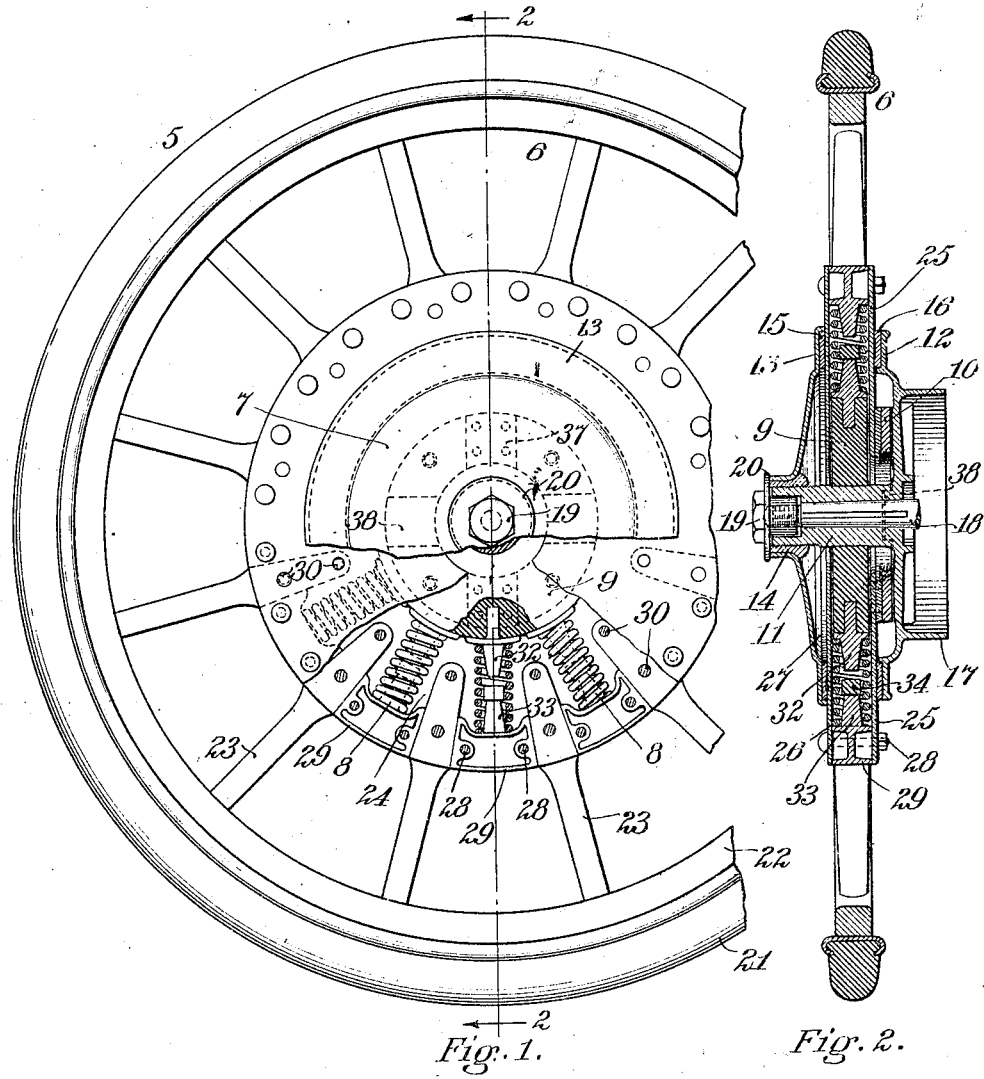
Figure 3:
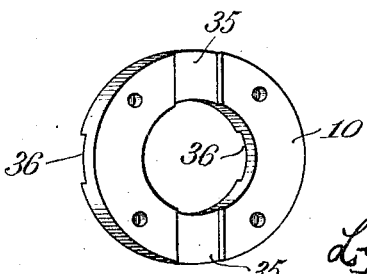

Referring to the drawings. Figure 1 is a side elevation of my improved wheel, partly broken away and shown in section. Fig. 2 is a sectional elevation taken on line 2—2 of Fig. 1. Fig. 3 is a perspective view of the clutch which couples the hub and rim of the wheel together.

Like numerals refer to like parts throughout the several views of the drawings.

In the drawings, 5 is the wheel, consisting of a rim 6 and a hub 7 with springs 8, 8 and a flange 9 formed of rubber or other yielding material interposed between said hub and rim. The rim 6 and the hub 7 are coupled together by a collar 10, so that said hub and rim cannot be rotated relatively to each other, but can be moved radially relatively to each other.

The hub 7, as a whole, consists of a sleeve 11 (Fig. 2) which has two flanges 12 and 13 extending outwardly therefrom, the flange 12 being preferably integral with the sleeve 11 and the flange 13 being adjusted on said sleeve 11 toward and away from the flange 12. This adjustment is secured by screw-threaded engagement of the flange 13 with the sleeve 11, said flange being reinforced by a collar 14 which is internally screw-threaded to engage a screw-thread provided upon the periphery of the sleeve 11.

The flange 13 has a bearing ring 15, preferably formed of phosphor bronze upon the inner face thereof and the flange 12 also has a bearing ring 16 upon its inner face. The flange 12 has a rim 17 thereon to receive the brake and is keyed to the shaft 18. Said shaft 18 is screw-threaded at its outer end and is engaged by a nut 19 which has a flange 20 thereon arranged to bear against the flange 13. Thus, by screwing up on the nut 19 the axle 18 is drawn into the sleeve 11 of the hub and being tapered at its outer end and keyed to said sleeve, said hub and axle are thus firmly fastened to each other.

The rim 6 consists of a solid rubber tire 21 which encircles a felly 22 having a series of spokes 23 extending inwardly therefrom and between and into an annular recess 24 located between two inwardly extending flanges 25 and 26, said flanges extending inwardly toward the hub and between and into the annular recess 27 located between the flanges 12 and 13. The flanges 25 and 26 are fastened together by bolts 28, 28 which extend through said flanges and also extend through plates 29, 29, and the spokes 23 are fastened to said flanges and between the adjacent ends of the plates 29, 29 by rivets 30, 30.

A ring or flange 9 of elastic material, preferably rubber, is mounted upon the sleeve 11 of the hub 7 and is provided with a series of fingers 32 in its periphery which extend into the springs 8 to hold the same in position, a similar series of fingers 33 extending inwardly from the different plates 29, 29 to hold the outer ends of the springs 8 in position, and between the inner ends of these two series of fingers, blocks of rubber 34, 34 are inserted within the springs 8 to prevent the adjacent ends of the two series of fingers from abutting against each other when an unusually heavy shock is imparted to the wheel.

The collar 10, which couples the hub and rim together, is provided on one side thereof with grooves 35, 35 and upon its opposite face it is provided with grooves 36, 36, these grooves preferably extending in directions at right angles to each other.

The flange 25 has blocks 37, 37 riveted thereto which constitute ways and which project into the groove 35. The flange 12 has similar blocks 38, 38 thereon which project into the grooves 36, 36 and form ways upon which the collar 10 can slide in one direction, while the blocks 37, 37 form ways upon which said collar can slide in another direction.

The operation of the wheel, particularly in respect to the relative movements of the rim with relation to the hub is as follows: It will be seen that the hub and rim are locked against relative rotation by the blocks 37 and 38 which extend into the grooves 35, 35 and 36, 36, respectively, in the collar 10, and by said collar 10 interposed between the hub and rim, but it will be evident that if the rim is pushed upwardly when in the position shown in Fig. 1, the springs 8, 8 will yield to allow the same to be moved toward the hub and the flange 25 will be free to slide upwardly in the grooves 35 in the collar 10, and if the wheel were turned to a position at right angles to that shown in Fig. 1, the rim, when moved upwardly, would slide, together with the collar 10, upon the ways 38, 38 on the flange 12, and at any position intermediate the two hereinbefore set forth, the rim will slide upon the collar or the rim and collar will slide upon the hub. It will be seen that during this relative sliding of the rim with relation to the hub, the flanges 25 and 26 will slide between the flanges 12 and 13 and in contact with the bearing rings 15 and 16. Also it will be understood that any wear which takes place between the flanges, on account of their sliding movement, may be taken up by adjusting the flange 13 upon the sleeve 11, and this is done by loosening the nut 19, rotating the flange 13 upon the sleeve 11 until the wear is taken up and then locking said flange in position by screwing up on the nut, it being understood that the nut 19 acts both to lock and draw the shaft 18 into the sleeve 11 of the hub and also to lo the flange 13 in position relatively to the hub sleeve 11 after said flange has been adjusted to take up the wear. Thus, it will be seen and understood that while the hub 7 is movable radially toward any point in the periphery of the rim or in the periphery of the rubber tire 21, yet said hub and rim are locked together against relative rotation by the collar 10 and the blocks 37 and 38 projecting into their respective grooves in said collar, so that the wheel, while being free to yield radially thereof between the rim and hub, is so constructed that the hub and rim are positively locked together against relative rotation and thus contain the same advantages as to the driving of the wheel by the axle as though the rim and hub were rigidly fastened together.

Having thus described my invention, what I claim and desire by Letters Patent to secure is:

1. A vehicle wheel having, in combination, a rim, a hub embodying in its construction a central sleeve portion, a collar of resilient material surrounding said sleeve, a series of resilient elements interposed between said collar and rim, with their inner ends seated against said collar independently of each other, and means interposed between said hub and rim whereby said hub and rim are positively locked against relative rotation in opposite directions and are movable radially thereof relatively to each other.

2. A vehicle wheel having, in combination, a rim, a hub embodying in its construction a central sleeve portion, a collar of resilient material surrounding said sleeve, a series of fingers projecting radially from the periphery of said collar, a series of springs interposed between said collar and rim with their inner ends engaging said fingers, and means interposed between said hub and rim, whereby said hub and rim are positively locked against relative rotation in opposite directions and are movable radially thereof relatively to each other.

In testimony whereof I have hereunto set my hand in presence of two subscribing witnesses

LEO L. ROGERS.

Witnesses:
 CHARLES S. GOODING,
 LOUIS A. JONES.